(12) United States Patent
Yang (10) Patent No.: US 11,860,467 B2
(45) Date of Patent: Jan. 2, 2024

(54) COLOR FILTER SUBSTRATE, DISPLAY PANEL AND DISPLAY DEVICE

(71) Applicant: HKC CORPORATION LIMITED, Shenzhen (CN)

(72) Inventor: Yanna Yang, Shenzhen (CN)

(73) Assignee: HKC Corporation Limited, Shenzhen (CN)

( * ) Notice: Subject to any disclaimer, the term of this patent is extended or adjusted under 35 U.S.C. 154(b) by 0 days.

(21) Appl. No.: 18/078,355

(22) Filed: Dec. 9, 2022

(65) Prior Publication Data

US 2023/0296937 A1  Sep. 21, 2023

(30) Foreign Application Priority Data

Mar. 15, 2022 (CN) .......................... 202210250988.1

(51) Int. Cl.
| | | |
|---|---|---|
| *G02F 1/1335* | (2006.01) | |
| *G02F 1/1337* | (2006.01) | |
| *G02F 1/1339* | (2006.01) | |

(52) U.S. Cl.
CPC ...... *G02F 1/133514* (2013.01); *G02F 1/1337* (2013.01); *G02F 1/1339* (2013.01)

(58) Field of Classification Search
CPC . G02F 1/133514; G02F 1/1337; G02F 1/1339
USPC .......................................................... 349/56
See application file for complete search history.

(56) References Cited

U.S. PATENT DOCUMENTS

2017/0097533 A1*  4/2017  Park ................. G02F 1/133345

FOREIGN PATENT DOCUMENTS

| CN | 1284707 A | 2/2001 |
|---|---|---|
| CN | 102236208 A | 11/2011 |
| CN | 104570487 A | 4/2015 |
| CN | 104656312 A | 5/2015 |
| CN | 106468836 A | 3/2017 |
| CN | 208766427 U | 4/2019 |
| CN | 208999729 U | 6/2019 |
| KR | 20070065664 A | 6/2007 |

* cited by examiner

*Primary Examiner* — Edward J Glick
*Assistant Examiner* — William D Peterson
(74) *Attorney, Agent, or Firm* — Maier & Maier, PLLC (57) ABSTRACT

A color filter substrate, a display panel, and a display device. The color filter substrate includes a base substrate, a common electrode layer covered on the base substrate, and a first alignment layer covered on the common electrode layer. The first alignment layer has a display region and a sealant region for connecting a frame sealant. One or a plurality of opening (s) is/are arranged on the first alignment layer, and one or a plurality of electrical conductor(s) embedded in the frame sealant is/are configured to insert into the one or a plurality of opening(s) to be electrically connected with the common electrode layer. According to the present application, a problem of a frequently occurred poor conductivity between the array substrate and the common electrode layer of the color filter substrate in the display panel of the related art is solved.

15 Claims, 5 Drawing Sheets

COLOR FILTER SUBSTRATE, DISPLAY PANEL AND DISPLAY DEVICE

CROSS-REFERENCE TO RELATED APPLICATION

Pursuant to 35 U.S.C. § 119 and the Paris Conversion, this application claims priority to Chinese Patent Application No. 202210250988.1 filed Mar. 15, 2022, the entire contents of which are incorporated herein by reference.

TECHNICAL FIELD

The present application relates to the field of display technologies, and more particularly, to a color filter substrate, a display panel and a display device.

BACKGROUND

With the rapid development of the industry of display panel, narrow-bezel displays are becoming more and more attractive to people. In order to achieve a narrow bezel display, an array substrate and an alignment layer of a color filter substrate are overlapped with a frame sealant inevitably. In a color filter substrate of a display panel in the related art, the alignment layer is coated on all areas of the color filter substrate (i.e., the entire surface of the color filter substrate is coated), so that the alignment layer and the frame sealant are overlapped. Since the alignment layer is insulated, an electrical connection between an electrical conductor embedded in a sealant and a common electrode layer is blocked, a poor conductivity between the electrical conductor and the common electrode layer is prone to occur, and a normal operation of the display panel is affected accordingly.

SUMMARY

One objective of the embodiments of the present application is to provide a color filter substrate, a display panel and a display device, the alignment layer of the color filter substrate is provided with one or a plurality of opening(s), the electrical conductor(s) embedded in the sealant can insert into the opening(s) to be electrically connected with the common electrode layer, so that the problem of frequently occurred poor conductivity between the array substrate and the common electrode layer of the color filter substrate in the display panel of the related art is solved.

In order to achieve the objective, the technical solutions used in the present application are described below:

in the first aspect, a color filter substrate is provided in the embodiments of the present application, the color filter substrate includes a base substrate, a common electrode layer covered on the base substrate, and a first alignment layer covered on the common electrode layer. The first alignment layer is provided with a display region and a sealant region configured for connecting a frame sealant; the first alignment layer is provided with one or a plurality of opening(s), one or a plurality of electrical conductor(s) embedded in the frame sealant is/are configured to insert into the one or plurality of opening(s) so as to be electrically connected with the common electrode layer.

In some embodiments, each of the plurality of opening(s) has two oppositely arranged first edges, one of the first edges is located on one side of the sealant region away from the display region, and the other one of the first edges is located on one side of the sealant region adjacent to the display region.

In some embodiments, an inner side of the sealant region is provided with a first retaining wall and a second retaining wall protruding from the first alignment layer, the first retaining wall and the second retaining wall are arranged around the display region. The second retaining wall is located between the first retaining wall and the sealant region, and one or a plurality of notch(es) is/are provided at one or a plurality of position(s) of the second retaining wall corresponding to the one or plurality of opening(s), the one or plurality of notch(es) is/are configured to separate the second retaining wall into segments, and the one or plurality of notch(es) is/are located at the side of the opening(s) adjacent to the display region.

In some embodiments, the second retaining wall is configured to form two cross sections at each notch, and distances from the two cross sections located at two ends of the notch to a first position point along a length direction of the notch are equal; wherein the first position point is configured as a connection point between the common electrode layer and the electrical conductor.

In some embodiments, each opening is provided with two oppositely arranged second edges along the length direction of the notch. A distance from one cross section located at one side of the first position point to the first position point is greater than a distance from one second edge located at the one side of the first position point to the first position point, along the length direction of the notch.

In some embodiments, the notch has a length L ranging from 2 mm to 8 mm.

In some embodiments, the second retaining wall is connected with the first retaining wall through a connecting wall at one notch.

In some embodiments, the second retaining wall is configured to form two cross sections at the notch, the connecting wall has a guide surface, and the guide surface is connected between one of the two cross sections and the first retaining wall.

In some embodiments, the first alignment layer is provided with an alignment region, the alignment region is configured as an orthographic projection of the alignment layer located on the array substrate on the first alignment layer, and the first barrier wall is located at a periphery of the alignment region.

In some embodiments, an outer side of the sealant region is provided with a third retaining wall protruding from the first alignment layer.

In the second aspect, a display panel is further provided in the embodiments of the present application, the display panel includes an array substrate; the color filter substrate described in the first aspect, and a liquid crystal layer arranged between the array substrate and the color filter substrate.

In the third aspect, a display device is further provided in the embodiments of the present application, the display device includes the display panel described in the second aspect and a backlight module arranged at one side of the display panel.

According to the color filter substrate, the display panel and the display device disclosed in the embodiments of the present application, the opening(s) is/are formed on the first alignment layer, thus, when the electrical conductor(s) is/are connected with the common electrode layer, the electrical conductor(s) can directly insert into the opening to be electrically connected with the common electrode layer. The electrical conductor(s) need not to pierce the first alignment layer, so that the reliability of connection between the electrical conductor(s) and the common electrode layer is improved, the probability of occurrence of poor conductivity between the electrical conductor(s) and the common electrode layer is reduced, and a normal operation of the display panel is ensured.

DETAILED DESCRIPTION OF THE EMBODIMENTS

In order to make the objective, the technical solutions and the technical effects of the present application be clearer, the technical solutions in the embodiments of the present application will be described clearly and comprehensively. It is apparent that, the embodiments described below are only some embodiments of the present application, rather than all of the embodiments. With reference to the embodiments in the present application, other embodiments which are obtained by a person of ordinary skill in the art without paying creative labor, should all be included in the protection scope of the present application.

In addition, terms such as "the first" and "the second" are only used for the purpose of illustration, and should not be considered as indicating or implying any relative importance, or implicitly indicating the number of indicated technical features. Thus, technical feature(s) restricted by "the first" or "the second" can explicitly or implicitly comprise one or more such technical feature(s). In the description of the present application, a term "a plurality of" has the meaning of at least two, unless otherwise there is additional explicit and specific limitation for the term of "a plurality of".

In the present application, terms such as "mount", "connect with each other", "connect", "fix" and the like should be broadly interpreted, unless otherwise there is an additional explicit stipulation and limitation for the terms. For example, "connect" may be interpreted as being fixedly connected, detachably connected, or connected integrally; "connect" can also be interpreted as being mechanically connected or electrically connected; "connect" may be further interpreted as being directly connected or indirectly connected through intermediary, or interpreted as internal communication between two components or interaction relationship between the two components, unless otherwise there is an additional explicit stipulation and limitation for the terms. For the person of ordinary skill in the art, the specific meanings of the terms in the present application may be interpreted according to specific conditions.

In the present application, unless there is explicit stipulation and limitation, the first feature is "above" or "under" the second feature may be interpreted as the first feature is in direct contact with the second feature or the first feature is in indirect contact with the second feature through an intermediate medium. Also, the first feature is "above", or "at the top of" or "arranged on" the second feature may be interpreted as the first feature is above or obliquely above the second feature, or merely indicates that the first feature is higher than the second characteristic in height. The first feature is "below", or "at the bottom of", or "underneath" the second feature may be interpreted as the first feature is below or obliquely below the second feature, or merely indicates that the first feature is lower than the second feature in height.

Figure 1:
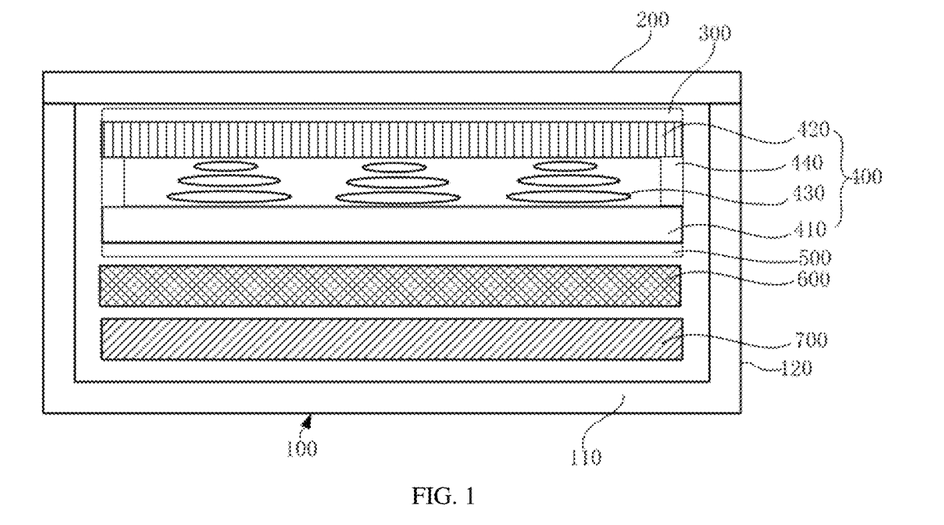
FIG. 1 illustrates a schematic structural diagram of a display device according to some embodiments of the present application.

In the description of the present application, it needs to be understood that, directions or location relationships (if exists) indicated by terms such as "internal", "external", "top", "bottom", "front", "rear" and the like are the directions or location relationships based on FIG. 1, and are only intended to describe the present application conveniently and are for the purpose of conciseness of the description, but should not be interpreted as indicating or implying that a device or a component indicated by the terms must have specific locations and be constructed and manipulated according to the specific locations. Therefore, these terms shouldn't be considered as limitation to the present application.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

As is used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

Moreover, in the descriptions of the present application, terms such as "first" and "second", etc., are only intended to be distinguished in description, but shouldn't be interpreted as indicating or implying a relative importance.

The descriptions of "referring to one embodiment" and "referring to some embodiments", and the like as described in the specification of the present application means that a specific feature, structure, or characters which are described with reference to this embodiment are included in one embodiment or some embodiments of the present application. Thus, the sentences of "in one embodiment", "in some embodiments", "in some other embodiments", "in other embodiments", and the like in this specification are not necessarily referring to the same embodiment, but instead indicate "one or more embodiments instead of all embodiments", unless there is a special emphasis in other manner otherwise. The terms "comprising", "including", "having" and their variations mean "including but is not limited to", unless otherwise they are specially emphasized in other manner.

The display device in the embodiments of the present application may be a display device having a display panel, such as a mobile phone, a desktop computer, a notebook computer, a tablet computer, a television, a vehicle-mounted display device, a wearable device (e.g., a smart watch), an advertising machine, a large advertising screen, etc.

As shown in FIG. 1, FIG. 1 is a schematic structural diagram of a display device according to some embodiments of the present application. A main structure of the display device includes a housing 100, a cover plate 200, an upper polarizer 300, a display panel 400, a lower polarizer 500, a backlight module 600, and a circuit board 700. The display panel 400 includes an array substrate 410, a color filter substrate 420, and a liquid crystal layer 430 arranged between the array substrate 410 and the color filter substrate 420. The array substrate 410 and the color filter substrate are connected through a frame sealant 440, so that the liquid crystal layer 430 is defined in a region enclosed by the frame sealant 440.

In some embodiments, the frame sealant 440 is generally arranged at edges of the array substrate 410 and the color filter substrate 420. The upper polarizer 300 is attached on a light exiting surface of the display panel 400, and the lower polarizer 500 is attached to a rear side of the display panel 400.

The housing 100 includes a bottom wall 110, side walls 120 arranged at peripheral edges of the bottom wall 110. The display panel 400, the backlight module 600 and the circuit board 700 are arranged in the housing 100. The cover plate 200 is connected with the side walls 120 of the housing 100, so that the display panel 400 is protected.

The backlight module 600 is arranged at one side of the display panel 400 (i.e., the rear side of the display panel 400).

The circuit board 700 is arranged at one side of the backlight module 600 away from the display panel 400, and the display panel 400 is electrically connected with the circuit board 700 through a connecting part, such as a chip on film (Chip On Film, COF).

The working principle of displaying of the display device is described below: the backlight module 600 emits white light, and white polarized light in a specific polarization direction is formed through the lower polarizer 500, the white polarized light is emitted into the array substrate 410. Then, red, green and blue polarized light are formed after the white polarized light is filtered by a color resist layer in the color filter substrate 420. When a polarization direction of the polarized light is perpendicular to a polarization direction of the upper polarizer 300, the polarized light cannot pass through the upper polarizer 300. When the polarization direction of the polarized light is parallel to the polarization direction of the upper polarizer 300, the polarized light is allowed to pass through the upper polarizer. In this condition, the emitted light has the greatest light intensity. Since the liquid crystal molecules in the liquid crystal layer 430 have optical rotation characteristics on the polarized light, a particular molecular arrangement direction can change the polarization direction of the polarized light. When the arrangement direction of the liquid crystal molecules is controlled to be rotated by an electric field of the pixel electrode and the common electrode layer, the polarization direction of the polarized light passing through the liquid crystal molecules is also changed, so that the amount of the polarized light emitted from the upper polarizer 300 can be controlled. When the pixel electrode and the common electrode layer control the liquid crystal molecules to be rotated regularly according to the electrical signals applied to the their respective electrodes, the light of the red sub-pixel, green sub-pixel and blue sub-pixel regularly passes through the upper polarizer 300, and a color image is formed finally. The sequence of optical path propagation is: light is emitted from the backlight module 600, and sequentially passes through the lower polarizer 500, the array substrate 410, the liquid crystal layer 430, the color filter substrate 420, and the upper polarizer 300.

In some embodiments, the backlight module 600 is a side-lit backlight module and includes a light source, a light guide plate, an optical film arranged on a light emitting side of the light guide plate, and a reflective film arranged on a rear side of the light guide plate, and the light source is arranged on a side surface of the light guide plate.

Where a cross section of the light guide plate has a wedge shape and a flat shape. The optical film may be a diffusion sheet, a brightness enhancement film, or the like. The optical film is not specifically limited herein. The brightness enhancement film may include a prism film and a reflective polarization brightness enhancement film. The prism film and the reflective polarization brightness enhancement film may be used in combination. The light source may be a light-emitting diode (Light-Emitting Diode, LED) and may also be a fluorescent lamp. The light source may be specifically determined according to actual situation.

In some other embodiments, the backlight module 600 is a direct type backlight module, and includes a reflective sheet and an optical film, the reflective sheet forms an accommodation cavity, one side of the accommodating cavity is provided with an opening, the optical film is arranged at the opening of the accommodation cavity, and the light source is arranged in the accommodating cavity.

In some embodiments, regarding the optical film, reference can be made to the structure of the side-lit backlight module in this embodiment, the detail of the optical film is not repeatedly described herein. The light source may be an LED. For example, the light source may be constructed as a lamp panel using micro blue light LEDs arranged in array, and arranged at the bottom of the accommodation cavity, and the light emitting direction of the lamp panel is oriented to the display panel 400.

Figure 4:
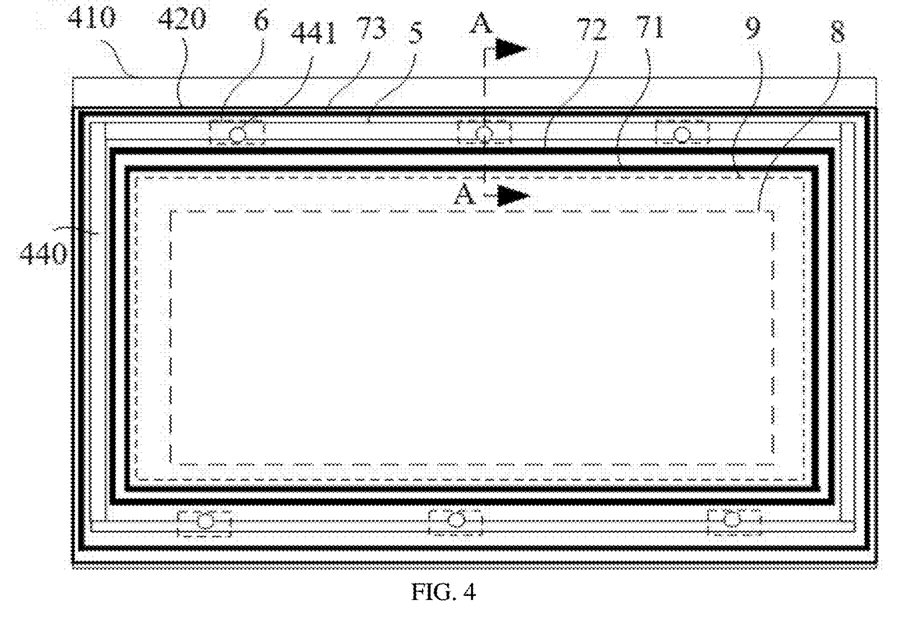
FIG. 4 illustrates a schematic layout diagram of a display panel according to some embodiments of the present application.
Figure 5:
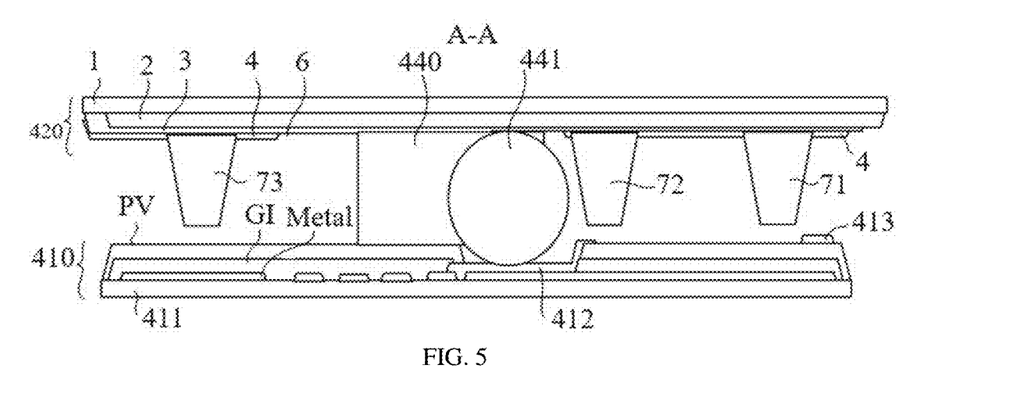
FIG. 5 illustrates a cross sectional view along a line A-A in FIG. 4.

As shown in FIG. 4 and FIG. 5, FIG. 4 illustrates a schematic layout diagram of the display panel 400 in some embodiments of the present application, FIG. 5 is a cross-sectional view along a A-A line of FIG. 4, and the dimension scale of the various film layers in FIG. 5 is not drawn according to the actual dimension scale of the various film layers in the product of the display panel 400. The array substrate 410 includes a supporting substrate 411 and functional film layers arranged on the supporting substrate 411. The functional film layers include an active layer, a source electrode, a drain electrode, a gate electrode, a gate insulating layer (i.e., the GI layer in FIG. 5), a passivation layer (i.e., the PV layer in FIG. 5), a pixel electrode, metal layers (the metal layer shown in FIG. 5, which includes the gate electrode, the common electrode wire, etc.), a connection electrode 412, an alignment layer 413, and the like.

The connection electrode 412 is electrically connected to the common electrode wire, and the connection electrode 412 is further electrically connected to an electrical conductor 441 embedded in the frame sealant 440. For example, the electrical conductor 441 is directly contacted with the connection electrode 412.

As shown in FIG. 4 and FIG. 5, the alignment layer 413 is arranged on the inner side of the frame sealant 440, so that the alignment layer 413 can be prevented from being covered on the connection electrode 412. When the electrical conductor 441 is connected to the connection electrode 412, the electrical conductor 441 pierces the alignment layer 413, thereby improving the reliability of the connection between the electrical conductor 441 and the connection electrode 412.

The supporting substrate 411 may be a blank substrate, and the supporting substrate 411 does not include any functional film layer arranged on the blank substrate. Furthermore, the supporting substrate 411 may also be a blank substrate including the functional film layer (e.g., a buffer layer). The blank substrate may be a glass substrate, a resin substrate, a sapphire substrate, etc., and the blank substrate is not specifically limited herein.

The materials of the pixel electrode and the connection electrode 412 may be indium tin oxide (Indium Tin Oxide, ITO). However, the materials are not limited herein. Other transparent conductive thin films may also be used as the materials of the pixel electrode and the connection electrode 412.

Figure 2:
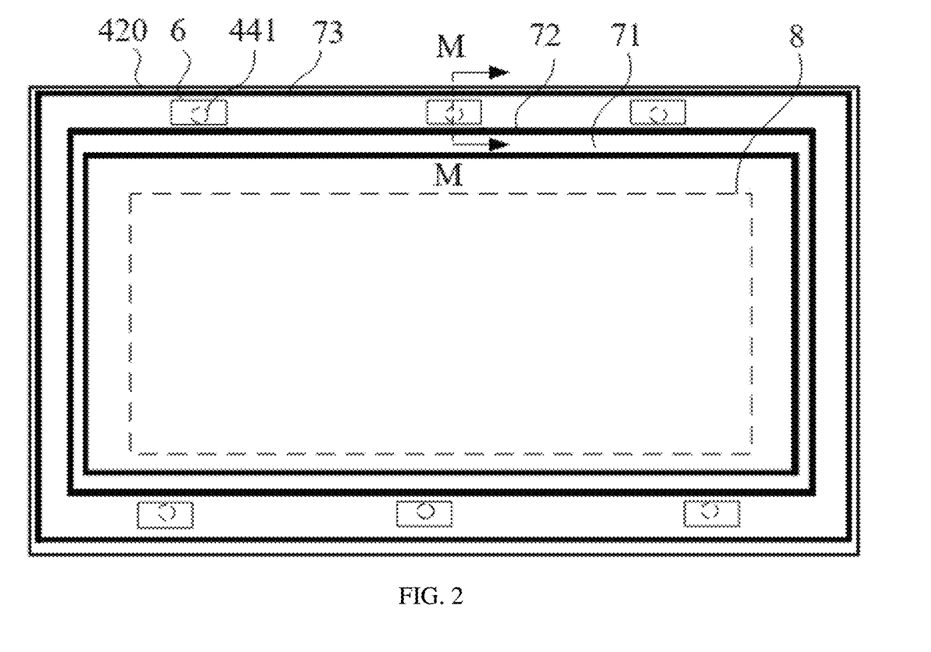
FIG. 2 illustrates a top view of a color filter substrate according to some embodiments of the present application.
Figure 3:
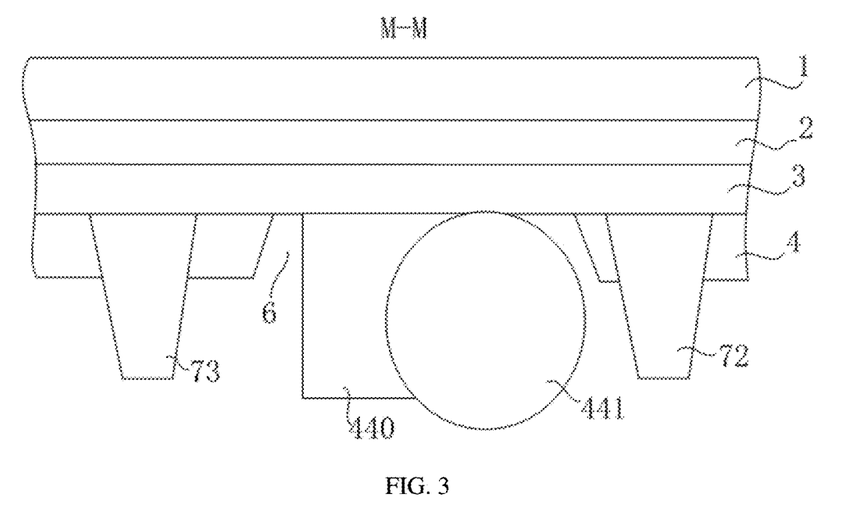
FIG. 3 illustrates a cross sectional view of the color filter substrate of FIG. 2 along a line M-M when the color filter substrate is connected with a frame sealant.

As shown in FIG. 2, FIG. 3 and FIG. 4, FIG. 2 illustrates a top view of the color filter substrate 420 in some embodiments of the present application. FIG. 3 illustrates a cross-sectional view of the color filter substrate 420 along a A-A line in FIG. 2 when the color filter substrate is connected with the frame sealant 440. The dimension scale of each film layer in FIG. 3 is not drawn according to the actual dimension scale of each film layer in the product of the color filter substrate 420. The color filter substrate 420 includes a base substrate 1, a black matrix 2, a color resist layer (not shown), a common electrode layer 3, and a first alignment layer 413.

The black matrix 2 is arranged on the base substrate 1, the black matrix 2 is in a grid shape, and the color resist layer is arranged in the grid of the black matrix 2. The color resist layer may include a color resist unit, and each color resist unit may be a red color resist (Red, R), a blue color resist (Blue, B), a green color resist (Green, G), and a color resist of three different colors are included. In this way, after the light passes through the RGB color resists, light of different colors can be combined, and a color display effect is realized.

The common electrode layer 3 is covered on the base substrate 1. In particular, the common electrode layer 3 is covered on the color resist layer and the black matrix 2. Certainly, if the black matrix 2 and the color resist layer are arranged at one side of the array substrate 410, the common electrode layer 3 may also be covered on the base substrate 1 directly.

The base substrate 1 may be a blank substrate, and does not include any functional film layer arranged on the blank substrate. In addition, the base substrate 1 may also be a blank substrate covered with a functional film layer (e.g., the buffer layer). The blank substrate may be the glass substrate, the resin substrate, the sapphire substrate, etc., and the blank substrate is not specifically limited herein. The material of the common electrode layer 3 may be ITO. However, the materials are not limited herein. Other transparent conductive thin films may also be used as the materials of the common electrode layer 3.

The first alignment layer 4 is covered on the common electrode layer 3, the first alignment layer 4 has a display region 8 and a sealant region 5 for connecting the frame sealant 440. The first alignment layer 4 is provided with one or a plurality of opening(s) 6, and the opening(s) 6 is/are used to be inserted by the electrical conductor(s) 441 which is/are embedded in the frame sealant 440, so that the electrical conductor(s) 441 is/are electrically connected with the common electrode layer 3. According to this arrangement, when the electrical conductor(s) 441 is/are connected with the common electrode layer 3, the electrical conductor(s) 441 can be directly inserted into the opening(s) 6 to be electrically connected to the common electrode layer 3. Thus, the electrical conductor(s) 441 need not to pierce the first alignment layer 4, the reliability of connection between the electrical conductor 441 and the common electrode layer is improved, and the probability of the occurrence of poor conduction between the electrical conductor 441 and the common electrode layer 3 is reduced, and the normal operation of the display panel 400 is ensured.

The aforesaid electrical conductor(s) 441 may be conductive ball, and the conductive ball may be a metal ball such as a gold ball and a silver ball. In addition to the conductive ball, the electrical conductor(s) 441 may also be electrical conductor(s) 441 having other shape (e.g., a square shape or an irregular shape). The electrical conductor(s) 441 may be partially embedded in the frame sealant 440, or be entirely embedded in the frame sealant 440, which is not specifically limited herein. There may be one or a plurality of electrical conductor(s) 441 connected between the connection electrode 412 and the common electrode layer 3 (as shown in FIGS. 2-5). The connection electrode 412 and the common electrode layer 3 are electrically connected through the multiple electrical conductors 441 connected in series, or in parallel, or in other manner.

Figure 6:
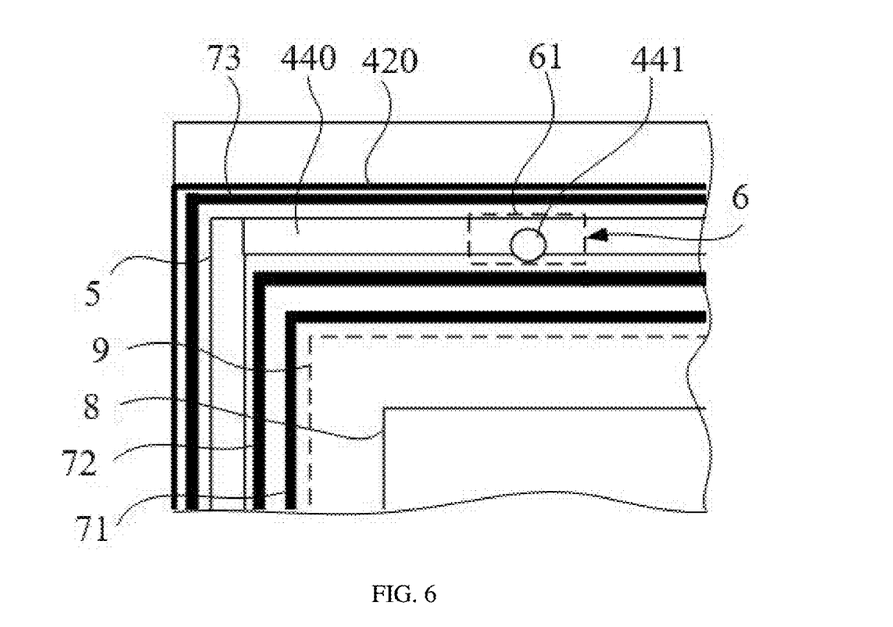
FIG. 6 illustrates a partial view of FIG. 4.

In some embodiments, as shown in FIGS. 4-6, FIG. 6 is a partial view of FIG. 4. Each opening 6 has two opposite first edges 61, one first edge 61 is located on one side of the sealant region 5 away from the display region 8, and the other one of the first edges 61 is located on one side of the sealant region 5 adjacent to the display region 8. According to this design, a size of the opening 6 in the width direction of the sealant region 5 can be increased, so that the position deviation of the electrical conductor 441 in the width direction of the sealant region 5 can be well absorbed, and it is ensured that the electrical conductor 441 can be smoothly inserted into the opening 6 to be electrically connected to the common electrode layer 3.

As shown in FIG. 2 and FIG. 4, the opening 6 may have a rectangular shape. However, the shape of the opening 6 is not limited herein. The opening 6 may also be in a waist shape (i.e., a racetrack shape, which is equivalent to replacing two opposite straight edges of the rectangle with two arc-shaped edges). One or a plurality of opening(s) 6 may be provided, and the number of the opening(s) 6 may be equal to the number of the connection electrode(s) 412 on the array substrate 410. For example, as shown in FIG. 2, there are six openings 6 arranged on two opposite sides of the display region 8, respectively. That is, three openings 6 are distributed on one side of the display region 8, and three openings 6 are distributed on the opposite side of the display region 8.

In some embodiments, as shown in FIG. 4 and FIG. 5, an inner side of the sealant region 5 is provided with a first retaining wall 71 and a second retaining wall 72 protruding from the first alignment layer 4, both the first retaining wall 71 and the second retaining wall 72 are arranged at the periphery of the display region 8, and the second retaining wall 72 is located between the first retaining wall 71 and the sealant region 5.

According to the arrangement of the first retaining wall 71, when the alignment layer 413 is coated on the color filter substrate 420, the first retaining wall 71 can block the alignment liquid (i.e., the material for forming the alignment layer 413, which is usually polyimide, as abbreviated as PI) from flowing outwards. According to the arrangement of the second retaining wall 72, when the array substrate 410 and the color filter substrate 420 are connected through the frame sealant 440, the second retaining wall 72 can prevent the frame sealant 440 from flowing inwards under the pressure of the array substrate 410 and the color filter substrate 420. Furthermore, the second retaining wall 72 is also served as drainage. That is, when alignment liquid is coated at a position adjacent to the opening 6, the alignment liquid may flow along the second retaining wall 72, so that the alignment liquid is prevented from flowing to the position of the opening 6.

In some embodiments, as shown in FIG. 4 and FIG. 5, an outer side of the sealant region 5 is provided with a third retaining wall 73 protruding from the first alignment layer 4. According to this arrangement, when the array substrate 410 and the color filter substrate 420 are connected through the frame sealant 440, the third retaining wall 73 may prevent the frame sealant 440 from being squeezed to flow outwards by the array substrate 410 and the color filter substrate 420.

In some embodiments, as shown in FIG. 4 and FIG. 5, the first alignment layer 4 has an alignment region 9, the alignment region 9 is configured as an orthographic projection of the alignment layer 413 on the first alignment layer 4 on the array substrate 410 (the array substrate 410 is in a state of being connected with the color filter substrate 420), and the first barrier wall 71 is located at the periphery of the alignment region 9.

By arranging the first retaining wall 71 on the periphery of the alignment area 9, so that the first retaining wall 71 can be prevented from being too adjacent to the display region 8 of the color filter substrate 420, and the alignment liquid can be prevented from flowing back to the edges of the display region 8 to cause an uneven thickness of the alignment layer 413 at the edges of the display region 8 when the alignment liquid is coated on the color filter substrate 420, so that a normal display of the display panel 400 is ensured.

In a manufacturing process of the color filter substrate 420, the first retaining wall 71, the second retaining wall 72, and the third retaining wall 73 need to be manufactured before in the first alignment layer 4 is formed. For example, as shown in FIG. 5, the first retaining wall 71, the second retaining wall 72, and the third retaining wall 73 may be arranged on the common electrode layer 3. Meanwhile, the first retaining wall 71, the second retaining wall 72, and the third retaining wall 73 also have a support function. When the display panel 400 is pressed to be deformed, the first retaining wall 71, the second retaining wall 72, and the third retaining wall 73 may abut against the array substrate 410 to support the color filter substrate 420 and the array substrate 410.

Figure 7:
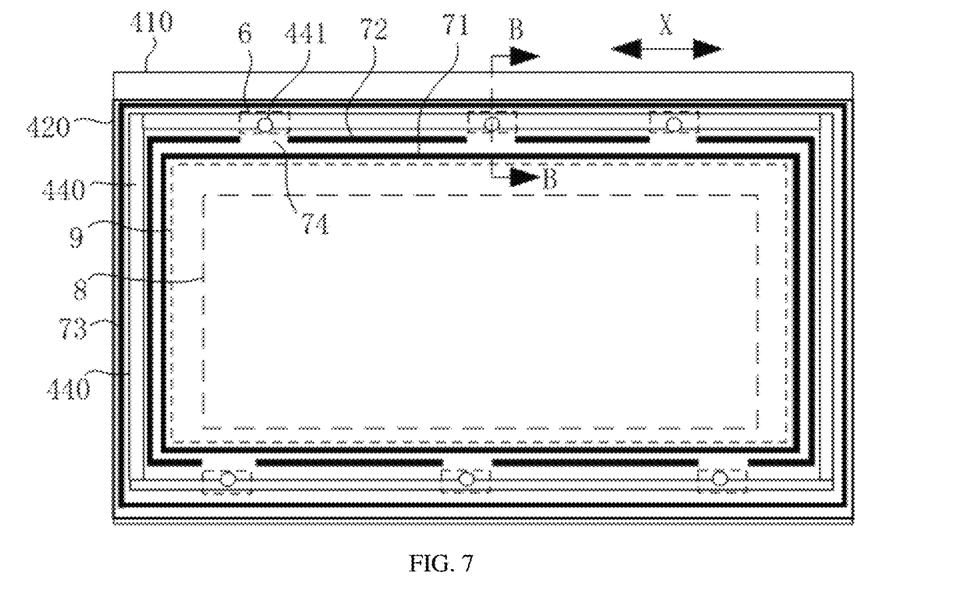
FIG. 7 illustrates a schematic layout diagram of the display panel according to some other embodiments of the present application.
Figure 8:
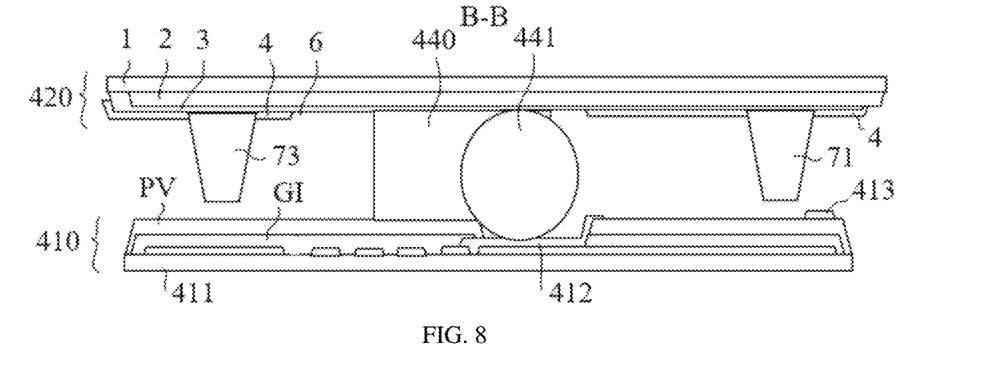
FIG. 8 is a cross sectional diagram along a line B-B in FIG. 7.

In some embodiments, as shown in FIG. 7 and FIG. 8, FIG. 7 illustrates a schematic layout diagram of a display panel 400 in some other embodiments of the present application. FIG. 8 illustrates a cross-sectional view along a B-B line of FIG. 7. Position(s) of the second retaining wall 72 corresponding to the opening(s) 6 is/are provided with one or a plurality of notches 74 for separating the second retaining wall 72, and the notch(es) 74 is/are located on one side of the opening 6 adjacent to the display region 8 of the color filter substrate 420.

In a process of connecting the color filter substrate 420 to the array substrate 410 and pressing the electrical conductor 441 into the opening 6, as shown in FIG. 5, the electrical conductor 441 is pressed and become large, and a part of the electrical conductor 441 is prone to be pressed on a top of the second retaining wall 72, so that a light leakage is caused due to too large gap between the second retaining wall 72 and the array substrate 410. By arranging the notch(es) 74 at the position where the second retaining wall 72 is located on the side of the opening 6 adjacent to the display region 8, the second retaining wall 72 can be kept away from the electrical conductor 441, such that the electrical conductor 441 can be prevented from being pressed on the top of the second retaining wall 72 in the process of pressing the electrical conductor 441 into the opening 6, and the light leakage caused due to too large gap between the second retaining wall 72 and the array substrate 410 is avoided accordingly.

As shown in FIG. 7, the number of the notch(es) 74 is equal to the number of the opening(s) 6. As shown in FIG. 7, the second retaining wall 72 is provided with six notches 74, which are equal to the number of the openings 6.

Figure 9:
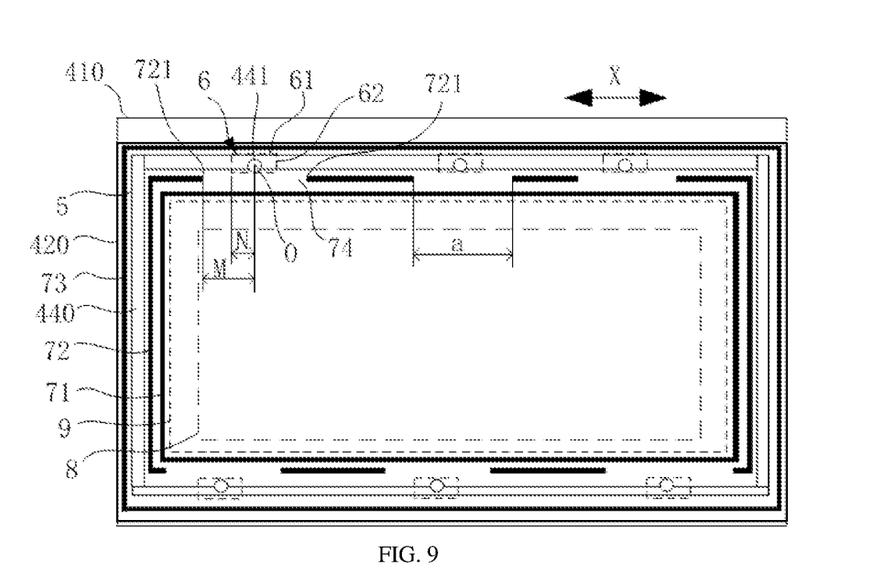
FIG. 9 illustrates a schematic layout diagram of the display panel according to some other embodiments of the present application.

In some embodiments, as shown in FIG. 9, FIG. 9 illustrates a schematic layout diagram of the display panel 400 in some other embodiments of the present application. The second retaining wall 72 forms two cross sections 721 at each notch 74, along a length direction X of the notch 74, the distance between the two cross sections 721 located at the two ends of the notch 74 and a first position point O is equal. That is, the distance from the two cross sections 721 at the two ends of notch 74 to the first position point O is M, and the first position point O is configured as the position point where the common electrode layer 3 is connected with the electrical conductor 441. According to this arrangement, when the alignment liquid is coated at a position adjacent to an opening 6, the alignment liquid located at the two sides of the opening 6 flows to the second retaining wall 72 at the notch 74 when the alignment liquid is at a certain distance from the first position point O. The alignment liquid further flows along the second retaining wall 72, such that the alignment liquid can be prevented from flowing to the first position point O to affect the conductivity between the electrical conductor 441 and the common electrode layer 3.

In some embodiments, the position point where the common electrode layer 3 is connected with the electrical conductor 441 may be a position point where the common electrode layer 3 is in contact with the electrical conductor 441. If the common electrode layer 3 is in a surface contact with the electrical conductor 441, the position point where the common electrode layer 3 is in contact with the electrical conductor 441 is a center point of the contact surface. For example, as shown in FIG. 9, the electrical conductor 441 is a conductive ball, which means that, the first position point O is an orthographic projection of a ball center of the electrical conductor 441 on the common electrode layer 3.

In some embodiments, as shown in FIG. 9, the opening 6 has two second edges 62 arranged opposite to each other along a length direction X of the notch 74. For the second edge 62 and the cross section 721 located at the same side of the first position point O, a distance A from the cross section 721 to the first position point O is greater than a distance N from the second edge 62 to the first position point O along the length direction X of the notch 74. According to this arrangement, when the alignment liquid is coated at the position adjacent to the opening 6, and when the alignment liquid is at a certain distance from the second edge 62, the alignment liquid flows to the second retaining wall 72 at the notch 74 and further flows along the second retaining wall 72, such that the alignment liquid can be prevented from flowing into the opening 6 to affect the conductivity between the electrical conductor 441 and the common electrode layer 3.

In some embodiments, as shown in FIG. 9, the length A of the notch 74 is an important parameter, and the value A should not be too large or too small. If the value of A is too large, the blocking effect of the second retaining wall 72 on the frame sealant 440 may be weakened. When the color filter substrate 420 and the array substrate 410 are aligned, the frame sealant 440 is pressed and is prone to flow from the notch 74 to the inner side of the second retaining wall 72. If the value A is too small, when the alignment liquid is coated at the position adjacent to the opening 6, the alignment liquid is prone to flow into the opening 6 at the notch 74 to affect the conductivity between the conductor 441 and the common electrode layer 3 negatively. After research, it has been found that when the length L of the notch 74 ranges from 2 mm to 8 mm, the second retaining wall 72 may not only block the frame sealant 440 very well, the alignment liquid cannot be prone to flow into the opening 6 due to the second retaining wall 72, so that a good conductivity between the electrical conductor 441 and the common electrode layer 3 is ensured.

Figure 10:
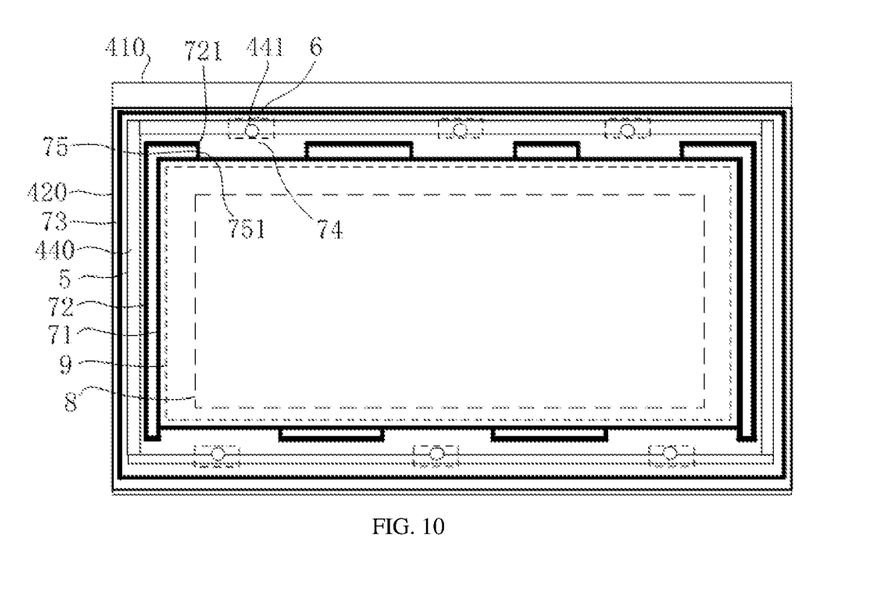
FIG. 10 illustrates a schematic layout diagram of the display panel according to some other embodiments of the present application.

In some embodiments, as shown in FIG. 10, FIG. 10 illustrates a schematic layout diagram of the display panel 400 in some other embodiments of the present application. The second retaining wall 72 is connected with the first retaining wall 71 through a connecting wall 75 at the notch 74. According to this arrangement, when the alignment liquid flows to a vicinity of the notch 74, the alignment liquid will flow to the first retaining wall 71 along the connecting wall 75 and is guided by the first retaining wall 71. Thus, the alignment liquid can be prevented from flowing into the opening 6 to affect the conductivity between the electrical conductor 441 and the common electrode layer 3.

In some embodiments, as shown in FIG. 10, the connecting wall 75 is provided with a guide surface 751, and this guide surface 751 is connected between one cross section 721 and the first retaining wall 71. According to this arrangement, when the alignment liquid flows to the vicinity of the notch 74, the alignment liquid flows to the first retaining wall 71 along the cross section 721 and the guide surface 751, thereby having a better guiding effect.

As shown in FIG. 10, the second retaining wall 72 is connected with the first retaining wall 71 through the connecting wall 75 at the two ends of the notch 74. According to this arrangement, the alignment liquid can be better prevented from flowing into the opening 6 to affect the conductivity between the electrical conductor 441 and the common electrode layer 3.

The aforesaid embodiments are only some specific embodiments of the present application. However, the protection scope of the present application is not limited by these embodiments. Changes or replacements, which can be easily think out by any one of ordinary skill in the art who is familiar with the technical field of the present application, should all be included in the protection scope of the present application. Thus, the protection scope of the present application should be determined by the protection scope of the claims.

What is claimed is:

1. A color filter substrate, comprising a base substrate, a common electrode layer covered on the base substrate, and a first alignment layer covered on the common electrode layer, wherein the first alignment layer is provided with a display region and a sealant region configured for connecting a frame sealant; wherein the first alignment layer is provided with one or a plurality of openings, one or a plurality of electrical conductors embedded in the frame sealant is/are configured to insert into the one or plurality of openings to be electrically connected with the common electrode layer;

wherein an inner side of the sealant region is provided with a first retaining wall and a second retaining wall protruding from the first alignment layer, the first retaining wall and the second retaining wall are arranged around the display region;

the second retaining wall is located between the first retaining wall and the sealant region, and one or a plurality of notch(es) is/are provided at one or a plurality of position(s) of the second retaining wall corresponding to the one or plurality of opening(s), the one or plurality of notch(es) is/are configured to separate the second retaining wall into segments, and the one or plurality of notch(es) is/are located at the side of the opening(s) adjacent to the display region.

2. The color filter substrate according to claim 1, wherein each of the plurality of openings have two oppositely arranged first edges, one of the first edges is located on one side of the sealant region away from the display region, and the other one of the first edges is located on one side of the sealant region adjacent to the display region.

3. The color filter substrate according to claim 1, wherein the second retaining wall is configured to form two cross sections at each notch, and distances from the two cross sections located at two ends of the notch to a first position point along a length direction of the notch are equal; wherein the first position point is configured as a connection point between the common electrode layer and the electrical conductor.

4. The color filter substrate according to claim 3, wherein each opening is provided with two oppositely arranged second edges along the length direction of the notch; a distance from one cross section located at one side of the first position point to the first position point is greater than a distance from one second edge located at the one side of the first position point to the first position point, along the length direction of the notch;

and the notch has a length L ranging from 2 mm to 8 mm.

5. The color filter substrate according to claim 1, wherein the second retaining wall is connected with the first retaining wall through a connecting wall at one notch.

6. The color filter substrate according to claim 5, wherein the second retaining wall is configured to form two cross sections at the notch, the connecting wall has a guide surface, and the guide surface is connected between one of the two cross sections and the first retaining wall.

7. The color filter substrate according to claim 1, wherein the first alignment layer is provided with an alignment region, the alignment region is configured as an orthographic projection of the alignment layer located on the array substrate on the first alignment layer, and the first barrier wall is located at a periphery of the alignment region;

and an outer side of the sealant region is provided with a third retaining wall protruding from the first alignment layer.

8. A display panel, comprising:
an array substrate;
a color filter substrate; and
a liquid crystal layer arranged between the array substrate and the color filter substrate;
wherein the color filter substrate comprises a base substrate, a common electrode layer covered on the base substrate, and a first alignment layer covered on the common electrode layer, the first alignment layer is provided with a display region and a sealant region configured for connecting a frame sealant; wherein the first alignment layer is provided with one or a plurality of opening(s), one or a plurality of electrical conductor(s) embedded in the frame sealant is/are configured to insert into the one or plurality of opening(s) so as to be electrically connected with the common electrode layer;
wherein an inner side of the sealant region is provided with a first retaining wall and a second retaining wall protruding from the first alignment layer, the first retaining wall and the second retaining wall are arranged around the display region;
the second retaining wall is located between the first retaining wall and the sealant region, and one or a plurality of notch(es) is/are provided at one or a plurality of position(s) of the second retaining wall corresponding to the one or plurality of opening(s), the one or plurality of notch(es) is/are configured to separate the second retaining wall into segments, and the one or plurality of notch(es) is/are located at the side of the opening(s) adjacent to the display region.

9. A display device, comprising:
the display panel according to claim 8; and
a backlight module arranged at one side of the display panel.

10. The display panel according to claim 8, wherein each of the plurality of openings have two oppositely arranged first edges, one of the first edges is located on one side of the sealant region away from the display region, and the other one of the first edges is located on one side of the sealant region adjacent to the display region.

11. The display panel according to claim 8, wherein the second retaining wall is configured to form two cross sections at each notch, and distances from the two cross sections located at two ends of the notch to a first position point along a length direction of the notch are equal; wherein the first position point is configured as a connection point between the common electrode layer and the electrical conductor.

12. The display panel according to claim 11, wherein each opening is provided with two oppositely arranged second edges along the length direction of the notch; a distance from one cross section located at one side of the first position point to the first position point is greater than a distance from one second edge located at the one side of the first position point to the first position point, along the length direction of the notch;
and the notch has a length L ranging from 2 mm to 8 mm.

13. The display panel according to claim 8, wherein the second retaining wall is connected with the first retaining wall through a connecting wall at one notch.

14. The display panel according to claim 13, wherein the second retaining wall is configured to form two cross sections at the notch, the connecting wall has a guide surface, and the guide surface is connected between one of the two cross sections and the first retaining wall.

15. The display panel according to claim 8, wherein the first alignment layer is provided with an alignment region, the alignment region is configured as an orthographic projection of the alignment layer located on the array substrate on the first alignment layer, and the first barrier wall is located at a periphery of the alignment region; and
an outer side of the sealant region is provided with a third retaining wall protruding from the first alignment layer.

* * * * *